(12) United States Patent
Zorzit et al.

(10) Patent No.: US 8,939,826 B2
(45) Date of Patent: Jan. 27, 2015

(54) HVAC APPARATUS WITH HRV/ERV UNIT AND VERTICAL FAN COIL UNIT

(75) Inventors: Vittorio Zorzit, Woodbridge (CA); Sheng Chu, Scarborough (CA)

(73) Assignee: Unilux V.F.C. Corp., Vaughan (CA)

( * ) Notice: Subject to any disclaimer, the term of this patent is extended or adjusted under 35 U.S.C. 154(b) by 356 days.

(21) Appl. No.: 13/183,660

(22) Filed: Jul. 15, 2011

(65) Prior Publication Data

US 2013/0017774 A1   Jan. 17, 2013

(51) Int. Cl.
*F24F 11/00* (2006.01)
*F24F 7/00* (2006.01)
*F24F 12/00* (2006.01)
*F24F 1/00* (2011.01)

(52) U.S. Cl.
CPC .............. *F24F 12/006* (2013.01); *F24F 1/0007* (2013.01); *F24F 2001/004* (2013.01); *F24F 2001/0051* (2013.01); *Y02B 30/563* (2013.01)
USPC ............................. 454/239; 454/237; 454/241

(58) Field of Classification Search
CPC .................................................... F24F 12/006
USPC .......................................... 454/237, 239, 241
See application file for complete search history.

(56) References Cited

U.S. PATENT DOCUMENTS

| | | | |
|---|---|---|---|
| 3,958,628 A | 5/1976 | Padden | |
| 5,485,878 A | 1/1996 | Derks | |
| 5,497,823 A | 3/1996 | Davis | |
| 6,514,138 B2 | 2/2003 | Estepp | |
| 6,575,228 B1 * | 6/2003 | Ragland et al. | 165/54 |
| 6,789,618 B2 | 9/2004 | Pearson | |
| 7,516,622 B2 | 4/2009 | Gauthier et al. | |
| 7,594,539 B2 * | 9/2009 | Isaka | 165/248 |
| 7,878,236 B1 | 2/2011 | Breen | |
| 7,942,193 B2 | 5/2011 | Caldwell | |
| 2003/0013407 A1 * | 1/2003 | Gagnon et al. | 454/237 |
| 2004/0079093 A1 | 4/2004 | Gauthier et al. | |
| 2008/0087034 A1 | 4/2008 | Jackson et al. | |
| 2009/0084861 A1 | 4/2009 | Arote et al. | |
| 2009/0133851 A1 | 5/2009 | Caldwell | |
| 2010/0025008 A1 | 2/2010 | Walford | |
| 2010/0076605 A1 | 3/2010 | Harrod et al. | |
| 2011/0021128 A1 | 1/2011 | Livchak et al. | |

FOREIGN PATENT DOCUMENTS

WO    2009065216 A1    5/2009

OTHER PUBLICATIONS

Lennux Industries Inc., Healthy Climate Ventilation Systems, 2007.
CIPO Office Action dated Aug. 23, 2013 in respect of Canadian Patent Application No. 2,746,405.

* cited by examiner

*Primary Examiner* — Steven B McAllister
*Assistant Examiner* — Helena Kosanovic
(74) *Attorney, Agent, or Firm* — Bereskin & Parr LLP/S.E.N.C.R.L., s.r.l.

(57) ABSTRACT

An apparatus for heating, ventilation and/or air conditioning of an interior space includes a heat exchanger core and a heating/cooling device in fluid connection with the heat exchanger core. A recirculation port is arranged between a supply air chamber and an outside air chamber. A damper is adapted to move between a first position in which the damper blocks the recirculation port and a second position in which the recirculation port is unblocked. When the damper is in the second position, at least a portion of supply air is guided to flow from the supply air chamber through the outside air chamber to the heat exchanger core so as to defrost the heat exchanger core.

14 Claims, 7 Drawing Sheets

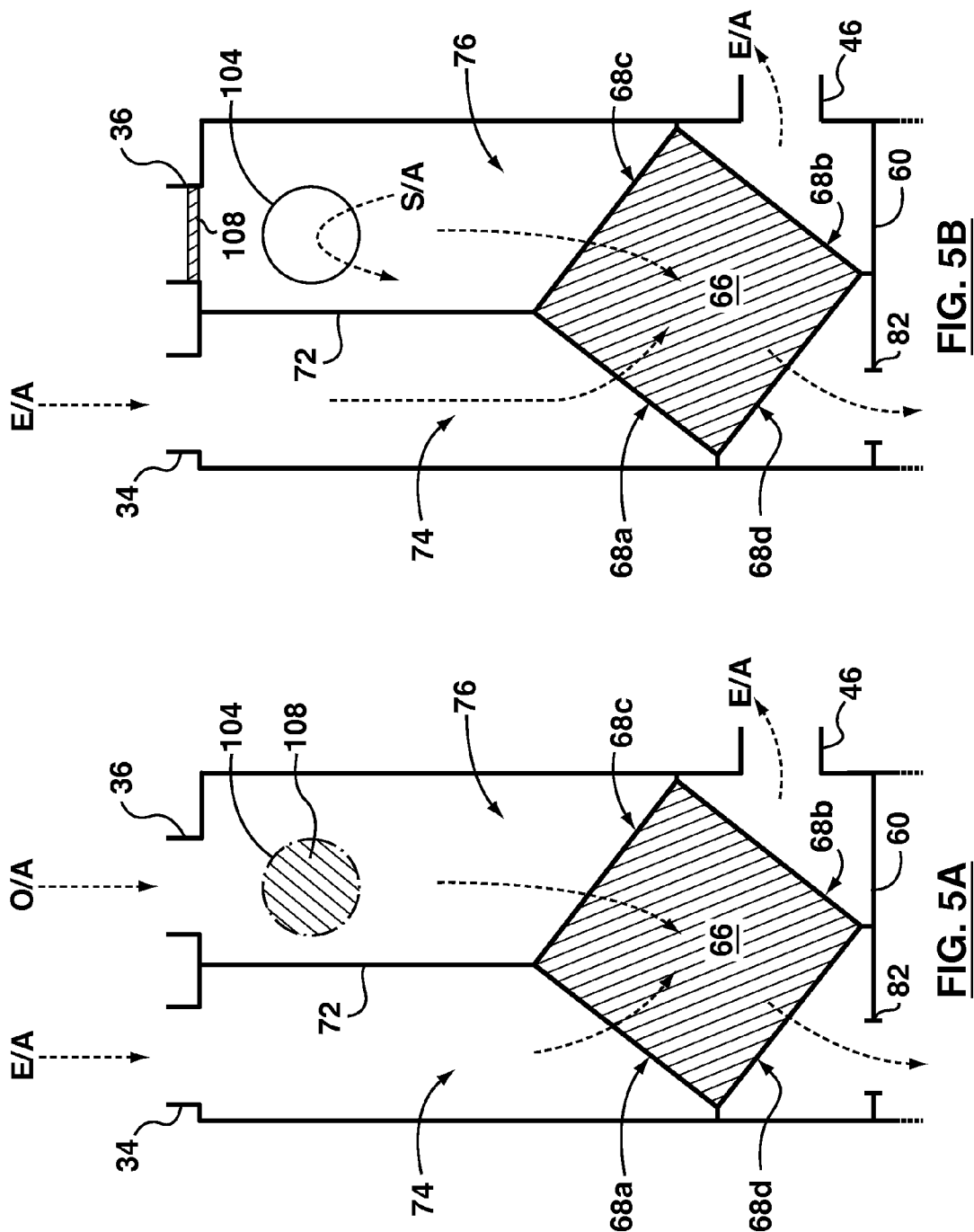

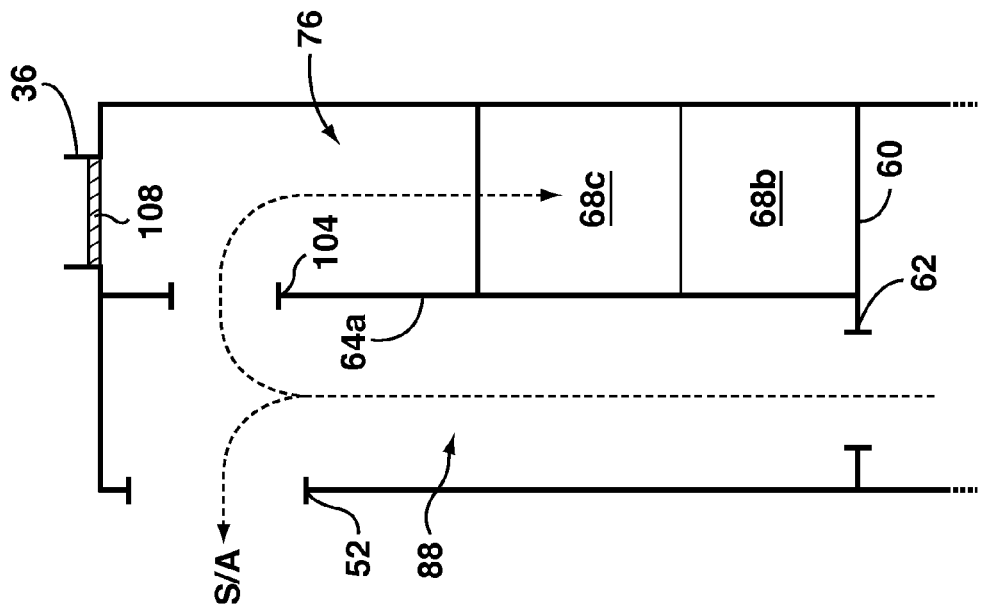
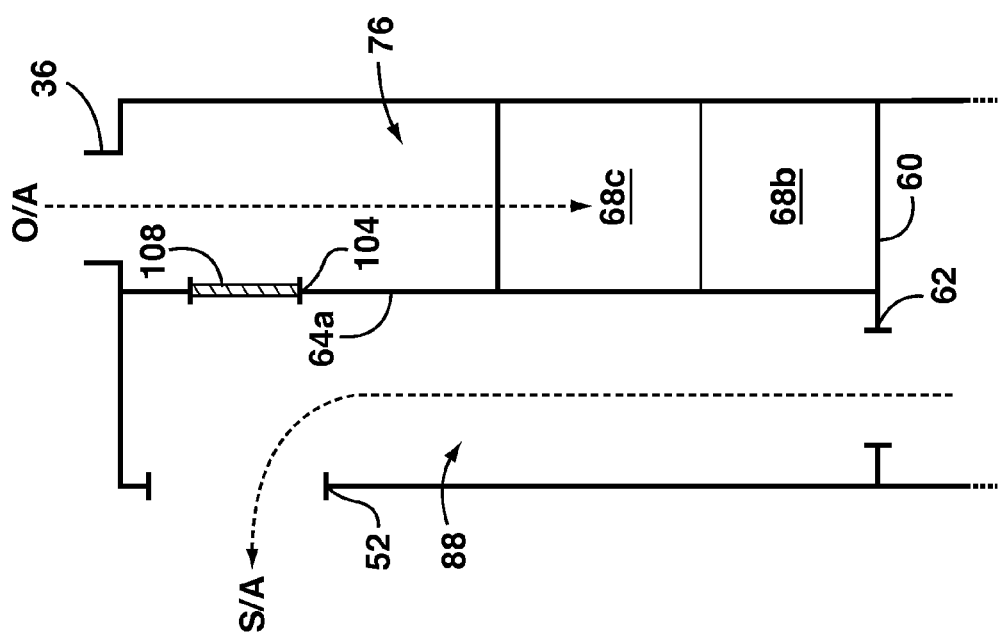
FIG. 6B
FIG. 6A

HVAC APPARATUS WITH HRV/ERV UNIT AND VERTICAL FAN COIL UNIT

FIELD

This specification relates to HVAC (heating, ventilation and/or air conditioning) technology.

BACKGROUND

The following paragraphs are not an admission that anything discussed in them is prior art or part of the knowledge of persons skilled in the art.

U.S. Pat. No. 3,958,628 describes a vertical blower coil unit for heating and cooling.

U.S. Pat. No. 5,497,823 describes an energy recovery ventilator (ERV) for exchanging indoor air with outdoor air.

U.S. Pat. No. 7,942,193 describes a defrost system for a heat recovery ventilator/energy recovery ventilator (HRV/ERV).

SUMMARY

In an aspect of this specification, an apparatus for heating, ventilation and/or air conditioning of an interior space of a structure can comprise: a housing comprising an exhaust air inlet, an exhaust air outlet, an outside air inlet, and a supply air outlet; a heat exchanger core arranged in the housing and comprising a first side and a second side segregated from the first side; an exhaust air chamber arranged between the exhaust air inlet and the first side of the heat exchanger core; an outside air chamber arranged between the outside air inlet and the second side of the heat exchanger core; a heating/cooling device in fluid connection with the second side of the heat exchanger core; a supply air chamber arranged between the heating/cooling device and the supply air outlet; a recirculation port arranged between the supply air chamber and the outside air chamber; and a damper adapted to move between a first position in which the damper blocks the recirculation port and a second position in which the recirculation port is unblocked, so that, when the damper is in the second position, at least a portion of supply air is guided to flow from the supply air chamber through the outside air chamber to the second side of the heat exchanger core so as to defrost the heat exchanger core.

In an aspect of this specification, an apparatus can comprise: a heat exchanger core having a first side and a second side segregated from the first side; an exhaust air inlet in fluid connection with the first side of the heat exchanger core, and adapted to guide exhaust air to the first side of the heat exchanger core; an exhaust air outlet in fluid connection with the first side of the heat exchanger core, and adapted to guide the exhaust air from the first side of the heat exchanger core to be expelled outside of an interior space; an outside air inlet in fluid connection with the second side of the heat exchanger core, and adapted to guide outside air through an outside air chamber to the second side of the heat exchanger core, so as to exchange heat between the exhaust air flowing through the first side of the heat exchanger core and the outside air; a heating/cooling device in fluid connection with the second side of the heat exchanger core, and adapted to condition the outside air to form supply air, and guide the supply air to a supply air chamber; a supply air outlet in fluid connection with the supply air chamber, and adapted to guide the supply air from the supply air chamber to be delivered to the interior space; a recirculation port arranged between the supply air chamber and the outside air chamber; and a damper disposed in the outside air chamber and adapted to pivot between a first position in which the damper blocks the recirculation port and a second position in which the damper blocks the outside air inlet, so that, when the damper is in the second position, the outside air is blocked from flowing to the second side of the heat exchanger core and at least a portion of the supply air is guided to flow from the supply air chamber to the second side of the heat exchanger core so as to defrost the heat exchanger core.

In an aspect of this specification, a method of heating, ventilation and/or air conditioning of an interior space of a structure can comprise: guiding exhaust air from the interior space to flow to a first side of a heat exchanger core; guiding the exhaust air from the first side of the heat exchanger core to be expelled to outside of the interior space; guiding outside air to flow to a second side of the heat exchanger core, so as to exchange heat between the exhaust air and the outside air; guiding the outside air from the second side of the heat exchanger core to flow through a heating/cooling device to form supply air; in a normal mode, guiding the supply air to the interior space; and in a defrost mode, guiding at least a portion of the supply air to flow through the second side of the heat exchanger core.

Other aspects and features of the teachings disclosed herein will become apparent, to those ordinarily skilled in the art, upon review of the following description of the specific examples of the specification.

DRAWINGS

The drawings included herewith are for illustrating various examples of apparatuses and methods of the present specification and are not intended to limit the scope of what is taught in any way. In the drawings:

FIGS. 5A and 5B are schematic front views showing air flows in the HRV/ERV unit of the apparatus of FIG. 1;

FIGS. 6A and 6B are schematic right side views showing air flows in the HRV/ERV unit of the apparatus of FIG. 1.

DETAILED DESCRIPTION

Figure 1:
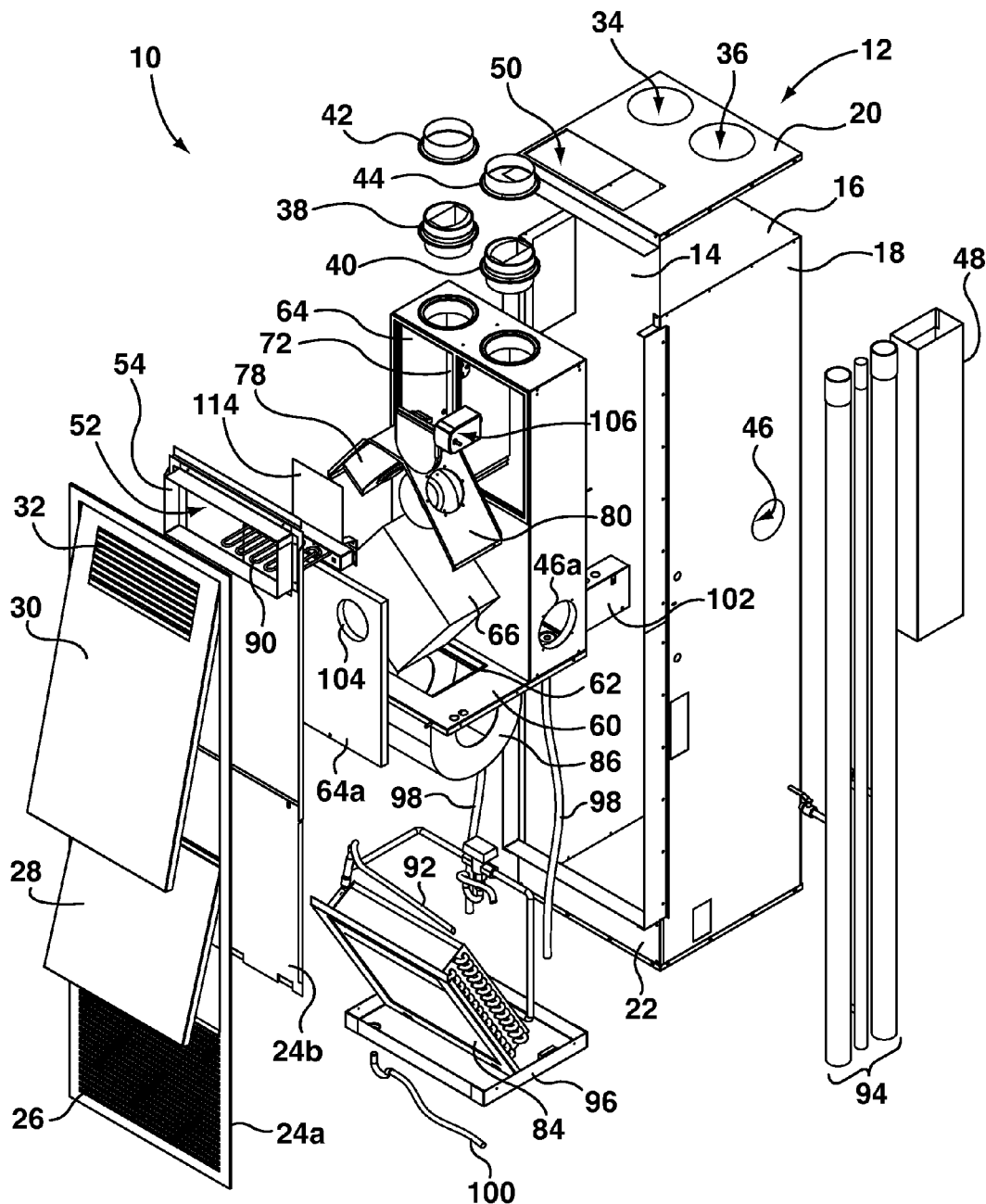
FIG. 1 is an exploded view of an example of an HVAC apparatus with a HRV/ERV unit and a vertical fan coil unit.

It will be appreciated that for simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, known methods, procedures and components have not been described in detail so as not to obscure the examples described herein. Also, the description is not to be considered as limited to the scope of the examples described herein.

Figure 2:
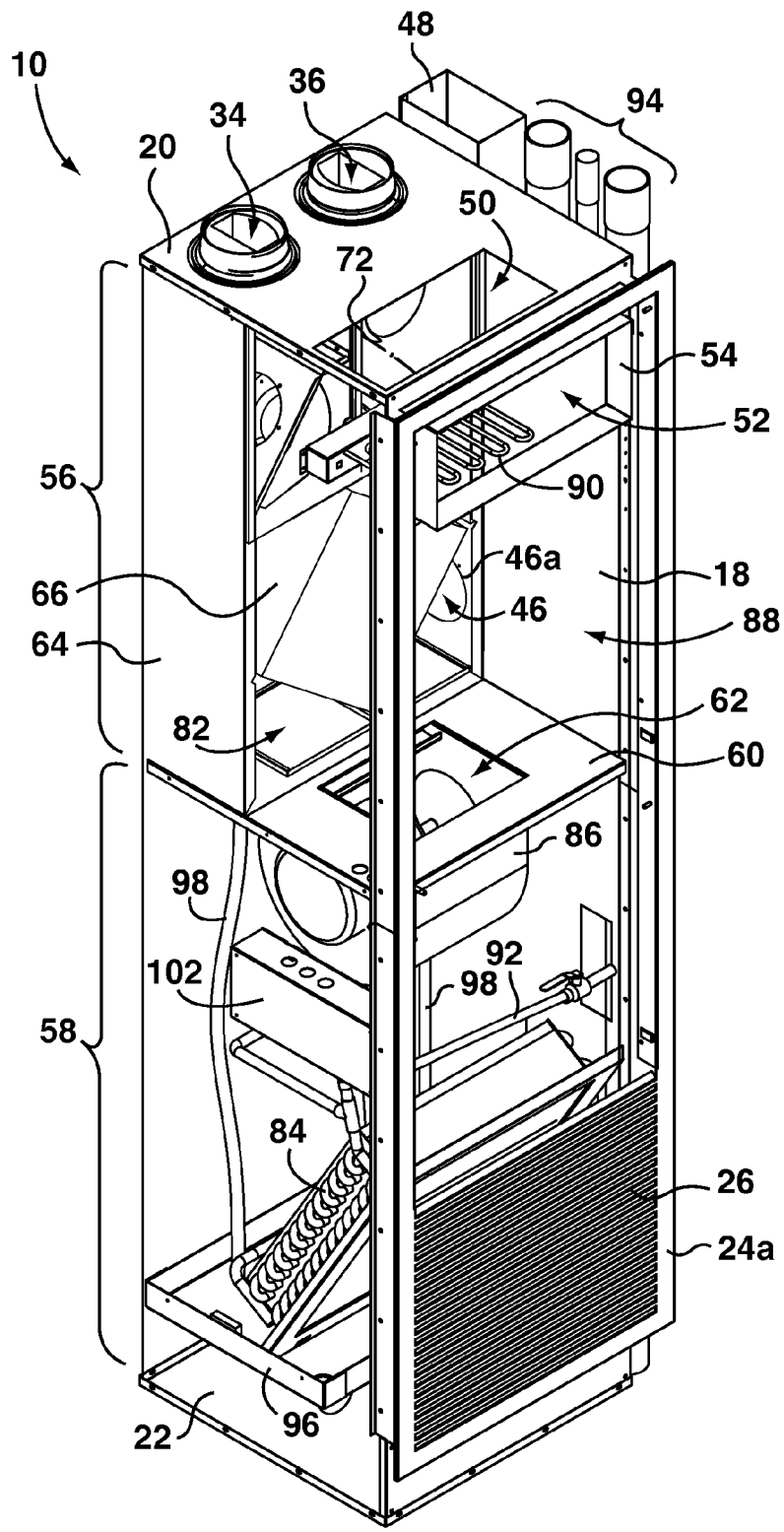
FIG. 2 is a cutaway perspective view of the apparatus of FIG. 1.
Figure 3:
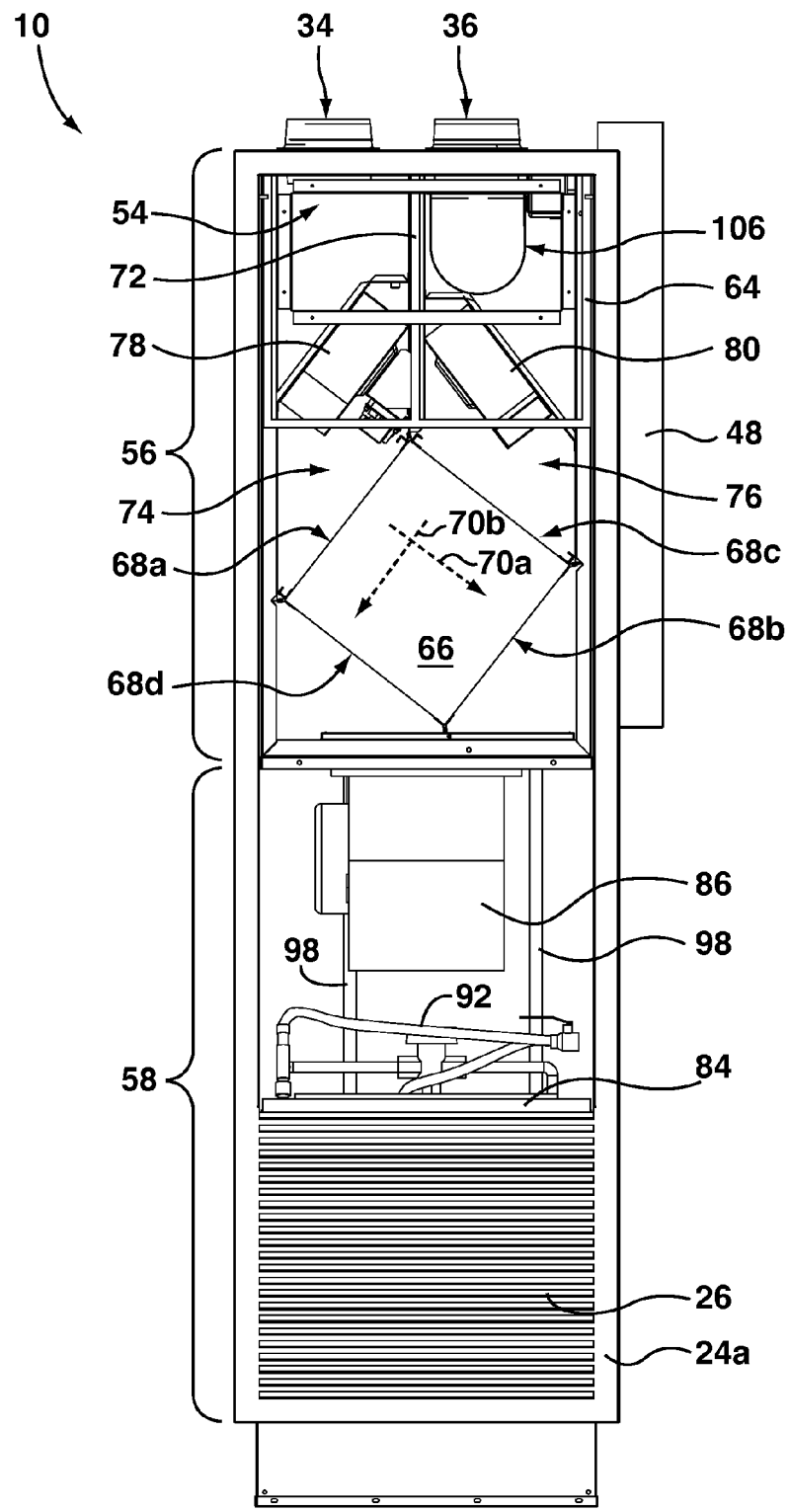
FIG. 3 is a cutaway front view of the apparatus of FIG. 1.

FIGS. 1, 2 and 3 show an example of an apparatus 10 for heating, ventilation and/or air conditioning of an interior space of a structure. For example, the apparatus 10 can be used for heating, ventilation and/or air conditioning of apartments, hotels and condominiums, and small single-family homes. Sizing of the apparatus 10 can vary depending on the desired application. For example, 450 CFM, 800 CFM, 1200 CFM implementations of the apparatus 10 are possible, with dimensions of the various components of the apparatus 10 being varied accordingly.

In the example illustrated, referring particularly to FIG. 1, the apparatus 10 includes a vertically elongated, box-shaped housing 12, having a left side wall 14, a rear wall 16, and a right side wall 18. The housing 12 further includes top and bottom panels 20, 22, which enclose top and bottom ends of the housing 12, respectively. An outer front panel 24a, in combination with a baffle panel 24b, generally encloses the front of the apparatus 10. The outer front panel 24a is shown to include a return air grille 26, a first hinged access door 28, a second hinged access door 30, and a supply air grille 32 formed in the second access door 30.

In the example illustrated, the top panel 20 includes openings which define an exhaust air inlet 34 and an outside air inlet 36. Optional flow regulators 38, 40 can be coupled to the inlets 34, 36, respectively. Further, flanges 42, 44 can be mounted to the flow regulators 38, 40, respectively, and can be used to connect tubular ductwork (not shown) to the apparatus 10.

In the example illustrated, an exhaust air outlet 46 is located on the right side wall 18. An optional exhaust air duct 48 can be connected to the exhaust air outlet 46, for guiding exhaust air upwardly to be expelled outside of the interior space.

The housing 12 further includes at least one supply air outlet. In the example illustrated, a first supply air outlet 50 is located in the top panel 20. The first supply air outlet 50 can be used to connect with ductwork (not shown) to guide and deliver supply air to one or more locations in the interior space. A second air outlet 52 is located towards the front of the apparatus 10 (formed in the baffle panel 24b), which is used to deliver supply air in the vicinity of the apparatus 10. A discharge flange 54 in the baffle panel 24b generally surrounds the second air outlet 52, and aligns with the supply air grille 32 of the outer front panel 24a to guide and deliver supply air out of the apparatus 10 to the interior space. In various examples, the housing 12 of the apparatus 10 can include the first supply air outlet 50, the second supply air outlet 52, or both.

Referring now particularly to FIGS. 2 and 3, the apparatus 10 is generally separated into two main sections. An upper portion of the apparatus 10 accommodates an HRV/ERV unit 56. Generally, in the HRV/ERV unit 56, exhaust air is used to precondition fresh, outside air, to exchange heat or heat and moisture. A lower portion of the apparatus 10 accommodates a vertical fan coil (VFC) unit 58. Generally, the VFC unit 58 serves to condition (heat or cool) air to form supply air for the interior space. A bulkhead 60 having an opening 62 is shown separating the HRV/ERV unit 56 from the VFC unit 58.

With continued reference to each of FIGS. 1, 2 and 3, the HRV/ERV unit 56 includes a cabinet 64. The interior of the cabinet 64 is accessible through a front panel 64a, and can include suitable insulation to reduce condensation and meet building code requirements. The cabinet 64 houses a heat exchanger core 66. The heat exchanger core 66 can take the form of a suitable HRV or ERV recuperator device having, for example, vertical flat plate, horizontal flat plate, or cellular configurations.

In the example illustrated, referring particularly to FIG. 3, exhaust air travels through a first side of the heat exchanger core 66 between a first face 68a and a second face 68b opposite the first face 68a, generally along direction 70a. Similarly, outside air travels through a second side of the heat exchanger core 66 between a third face 68c and a fourth face 68d opposite the third face 68c, generally along direction 70b. The first and second sides can be segregated from one another, so that there is generally no mixing of the streams of exhaust air and outside air. However, heat (examples in which the heat exchanger core 66 is an HRV device) or heat and humidity (examples in which the heat exchanger core 66 is an ERV device) is exchanged between the exhaust air and the outside air.

Flows of air through the heat exchanger core 66 are shown schematically in FIG. 5A.

Referring back to FIG. 3, above the heat exchanger core 66, left and right sides of the cabinet 64 are separated by a partition wall 72, defining an exhaust air chamber 74 and an outside air chamber 76, respectively. An exhaust air blower 78 is installed in the exhaust air chamber 74. In operation, the exhaust air blower 78 draws in exhaust air from the exhaust air inlet 34, through the exhaust air chamber 74 to the first side of the heat exchanger core 66. Similarly, an outside air blower 80 is installed in the outside air chamber 76. In operation, the outside air blower 80 draws in outside air from the outside air inlet 36, through the outside air chamber 76 to the second side of the heat exchanger core 66. Each of the blowers 78, 80 can consist of a centrifugal fan (e.g., high static with forward-curved blades) powered by an electric motor, which can be a permanent-split capacitor (PSC) motor or an electronically commutated motor (ECM). Each of the blowers 78, 80 can be configured to have a single speed (for example, 75 CFM), two speeds (for example, 35-45 CFM and 75 CFM), or in some cases more than two speeds.

Referring again to FIGS. 1, 2 and 3, below the heat exchanger core 66, opposite from the second face 68b, the exhaust air is guided through a side opening 46a in the cabinet 64 to the exhaust air outlet 46 in the right side wall 18, and optionally through the exhaust air duct 48, to be expelled outside of the interior space. As illustrated, the exhaust air outlet 46 is located generally laterally adjacent to the heat exchanger core 66, and is on the same side as risers 94 (shown in FIGS. 1 and 2). The arrangement of the exhaust air outlet 46 in this manner can create more space within the housing 12 to be utilized for a supply air chamber 88 (shown in FIG. 3 and described in further detail below), which can reduce both air noise and friction losses within the supply air chamber 88, without having to enlarge the overall footprint of the apparatus 10. Further, having the exhaust air outlet 46 located at the side of the apparatus 10 can free up the top of the apparatus 10 to simplify ductwork connections. Moreover, in examples without the exhaust air duct 48, the exhaust air outlet 46 can be used to vent the exhaust air directly outside, for example, via a generally horizontal duct through an exterior wall of the structure, which can reduce friction losses and thereby improve efficiency.

In the example illustrated, the blowers 78, 80 are located upstream from the heat exchanger core 66, and thus the HRV/ERV unit 56 of the apparatus 10 can be referred to as a "blow-through" configuration. However, in other examples, in accordance with a "draw-through" configuration, the relative positions of the exhaust air inlet and the exhaust air outlet can be reversed so that the blower 78 is provided downstream of the heat exchanger core 66, and the orientation of the blower 78 can be inverted. In such examples, in operation, the blower 78 draws in exhaust air from through the side opening 46a in the cabinet 64, through the first side of the heat exchanger core 66 and into the exhaust air chamber 74.

Below the heat exchanger core 66, opposite from the fourth face 68d, the cabinet 64 has a bottom opening 82 for guiding the outside air from the second side of the heat exchanger core 66 out of the HRV/ERV unit 56 and into the VFC unit 58. The VFC unit 58 includes a heating/cooling device 84 and a main fan 86. The heating/cooling device 84 can consist of any suitable device configured to heat and/or or cool air. In the example illustrated, heating/cooling device 84 consists of a water coil assembly, but combinations of other heating and cooling devices, including natural gas burners, heat pumps and air conditioners, can be implemented in other examples. The main fan 86 can consist of a centrifugal fan with forward-curved blades, and driven by an ECM, for example. The main fan 86 can have two or more speeds of operation.

The main fan 86 draws air from the second side of the heat exchanger core 66 through the bottom opening 82 and over the heating/cooling device 84 to form supply air. The supply air is then guided through the opening 62 in the bulkhead 60 into a supply air chamber 88. The supply air chamber 88 is formed in the upper portion of the housing 12, generally in front of the HRV/ERV unit 56, and is separated by the chambers 74, 76 by the front panel 64a of the cabinet 64. The supply air is then guided from the supply air chamber 88 through the first supply air outlet 50, the second supply air outlet 52, or both, to be delivered to the interior space. An optional auxiliary heating device 90 can be mounted within the supply air chamber 88 to provide additional heating to the supply air if desired.

In the example illustrated, at least one supply line 92 can be provided to deliver utilities (for example, hot water, cold water, natural gas, and/or other cooling/heating fluids), from the risers 94 (which can include, for example, a supply riser, a condensate riser, and a return riser), through a hole in the right side wall 18 to the heating/cooling device 84. A drain pan 96 can be arranged to collect condensate water from the heating/cooling device 84. An anti-flood sensor (not shown) can be mounted inside the drain pan 96. Drain lines 98 from the heat exchanger core 66 can also be provided to deliver condensate water collected in the heat exchanger core 66 to the drain pan 96. A drain line 100 can deliver water from the drain pan 96 through a hole in the right side wall 18 to the risers 94 for disposal.

Referring particularly to FIG. 1, the front panel 64a of the cabinet 64 of the HRV/ERV unit 56 includes a recirculation port 104. The recirculation port 104 is located between the supply air chamber 88 and the outside air chamber 76 (as shown in FIGS. 6A in 6B). A damper mechanism 106 can be used to block the recirculation port 104 or unblock the recirculation port 104, facilitating air flow between the supply air chamber 88 and the outside air chamber 76, as described in further detail below. A sound baffle 114 can be mounted in the supply air chamber 88, generally in front of and adjacent to the recirculation port 104, to reduce sound generated by the blower 80, particularly when the recirculation port 104 is unblocked.

Figure 4A:
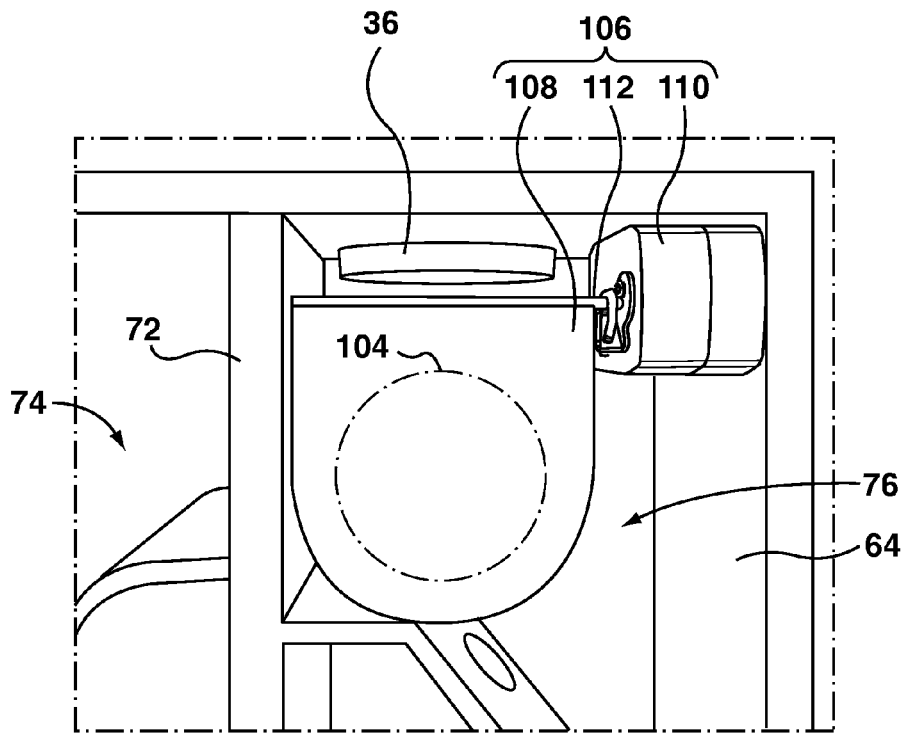
FIGS. 4A and 4B are detailed cutaway front views of the apparatus of FIG. 1, showing a damper in first and second positions, respectively.
Figure 4B:
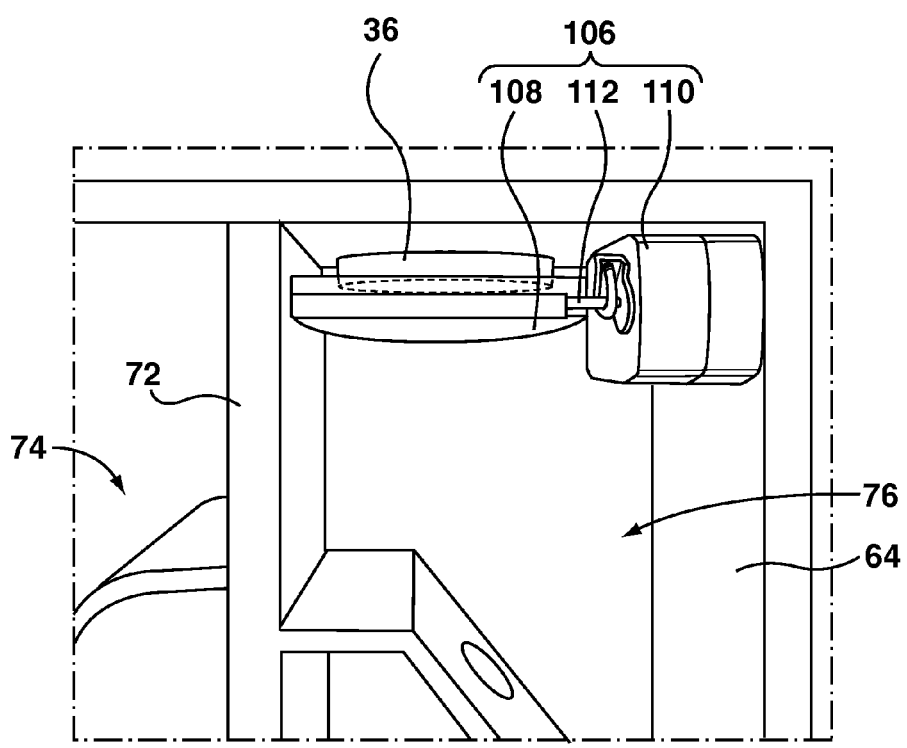

Referring now to FIGS. 4A and 4B, the damper mechanism 106 is located in the outside air chamber 76, and is shown to include a damper 108 coupled to a motor 110 by a control arm 112. In the example illustrated, the motor 110 pivots the damper 108 about the control arm 112 between a first position blocking the recirculation port 104 (FIG. 4A), and a second position blocking the outside air inlet 36 (FIG. 4B). With the pivotal movement of the damper 108 about the control arm 112, the damper mechanism 106 is a single device that can facilitate an approximately simultaneous opening of the recirculation port 104 and closing of the outside air inlet 36, and vice versa. In some examples, the control arm 112 and/or motor 110 can include a spring mechanism (not shown) to bias the damper 108 to the second position, so that in the event of a power failure the outside air inlet 36 is blocked to prevent outside air from entering the outside air chamber 76.

Shown in FIGS. 1 and 2, a control module 102 is provided to control the electrical devices of the apparatus 10. The control module 102 can include a programmable processing device, such as a microprocessor or microcontroller, Central Processing Unit (CPU), and the like, along with a suitable memory for storing control software. The control module 102 can be linked to an input device (for example, a touchscreen), and can be electronically connected to the various devices of the apparatus 10, including the blowers 78, 80, the heating/cooling device 84, the main fan 86, the auxiliary heating device 90, the motor 110, and one or more temperature sensors (not shown).

If the air temperature of the outside air flowing to the heat exchanger core 66 is cold, the heat exchanger core 66 can develop frost which can result in the flow of air through the heat exchanger core 66 being restricted or blocked entirely. Accordingly, the control module 102 can control operation of the apparatus 10 between a normal mode and a defrost mode.

Figure 7A:
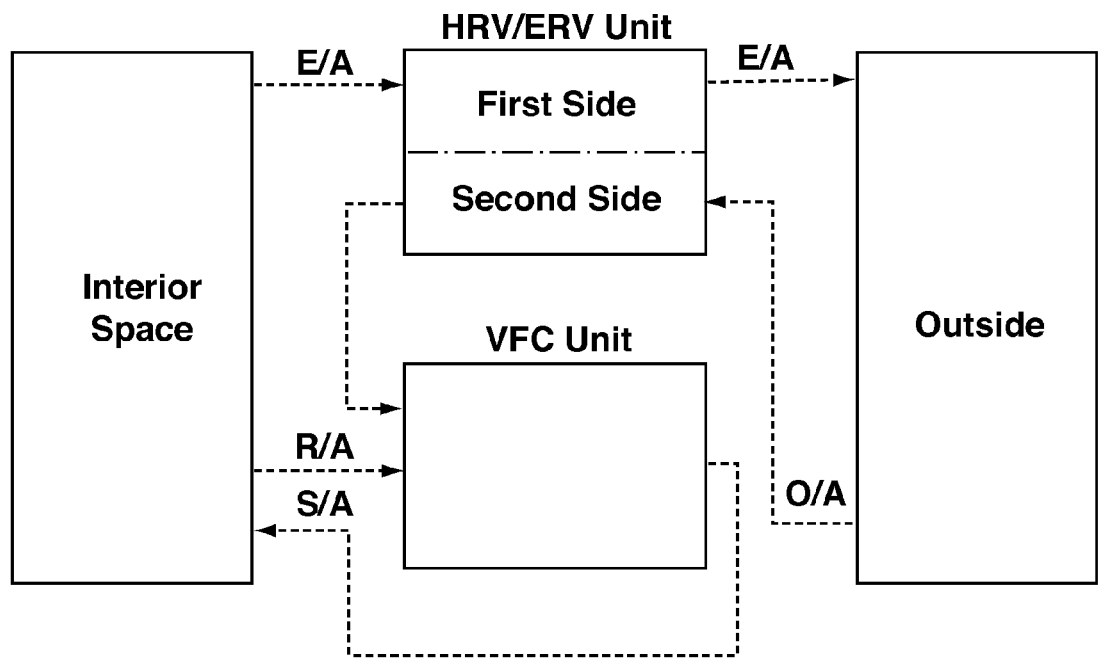
FIGS. 7A and 7B are flow diagrams.

Air flows through the apparatus 10 operating according to the normal mode are shown schematically in FIGS. 5A, 6A and 7A. The damper 108 is shown in the first position blocking the recirculation port 104. Exhaust air (E/A) is guided from the interior space to the exhaust air inlet 34, through the exhaust air chamber 74 and through the first side of the heat exchanger core 66, and then to the exhaust air outlet 46 to be expelled to the outside. Outside air (0/A) is guided from the outside to the outside air inlet 36, through the outside air chamber 76 and through the second side of the heat exchanger core 66, and then to the opening 82 to the VFC unit. Supply air (S/A) from the VFC unit is guided up from the opening 62, through the supply air chamber 88 and through the supply air outlet 52 to be delivered to the interior space.

Figure 7B:
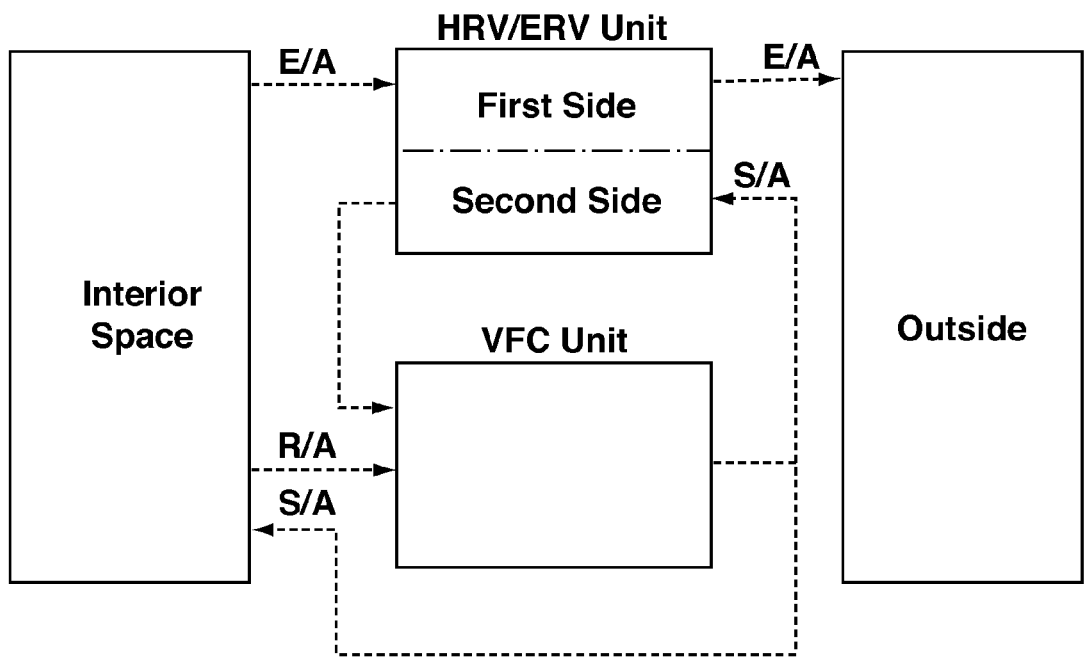

Air flows through the apparatus 10 operating according to the defrost mode are shown schematically in FIGS. 5B, 6B and 7B. The damper 108 is shown in the second position blocking the outside air inlet 36. The exhaust air can be guided through the apparatus 10 the same as per the normal mode. However, because the outside air inlet 36 is blocked, no outside air enters the outside air chamber 76. The supply air from the VFC unit is guided up from the opening 62, into the supply air chamber 88. At least a portion of the supply air is drawn by the blower 80 to flow from the supply air chamber 88 through the recirculation port 104 to the second side of the heat exchanger core 66 so as to defrost the heat exchanger core 66. The warm supply air can regenerate the heat exchanger core 66, either by melting any frost that has developed, or by increasing the temperature of the heat exchanger core 66 back to a desired range to ensure that frost buildup is avoided. The supply air is typically hotter than room temperature, so the heat exchanger core 66 can be defrosted thoroughly and quickly.

The remainder of the supply air, less the portion guided through the recirculation port 104, can be guided through the supply air outlet 52 to be delivered to the interior space as usual. The percentage of the supply air routed through the recirculation port 104 can be varied, depending on the application and the size of the various components, but in some cases 10 to 20% of the supply air flow can be adequate for regenerating the heat exchanger core 66 while in the defrost mode.

Optionally, in the defrost mode, the control module 102 can shut off the exhaust air blower 78, so that no exhaust air is expelled from the apparatus 10, thereby avoiding negative pressurization of the interior space. In other examples, the control module 102 can reduce the speed of the exhaust air blower 78 in the defrost mode to lessen negative pressurization of the interior space.

The control module 102 can be programmed to carry out various sequences between the normal and defrost modes.

During operation in the normal mode, the control module 102 can receive input from the input device and/or a thermostat (not shown) located in the interior space, and when set to "auto" can cycle the heating/cooling device 84 to ensure that the temperature of the interior space stays roughly at a desired set temperature. Speed of the main fan 86 can be varied automatically depending on the temperature difference between the interior space and the set temperature. After the set temperature is reached, the main fan 86 can return to a low ventilation speed. The VFC unit 58 can also be run for ventilation only, and without temperature adjustment by the heating/cooling device 84, and with the speed of the main fan 86 varied manually using the user input device and/or the thermostat.

The control module 102 can be electrically connected to at least one temperature sensor (not shown), installed within the HRV/ERV unit 56, to provide an accurate measure of the temperature of the outside air. For example, the temperature sensor can be located within the outside air chamber 76, or immediately downstream from the fourth face 68d of the heat exchanger core 66. Using the temperature sensor, the control module 102 can monitor the air temperature, either continuously or periodically.

In some examples, if the temperature of the outside air remains above a preset "threshold" temperature (for example, −5° C.), then the apparatus 10 continues to operate in the normal mode. However, if the temperature is less than the preset temperature, the control module 102 can switch from the normal mode to the defrost mode, by instructing the motor 110 to pivot the damper 108 from the first position to the second position, and optionally shutting off the exhaust air blower 78. The defrost mode can continue for a preset defrost interval (for example, 6 minutes), at which point the control module 102 can switch back to the normal mode by instructing the motor 110 to pivot the damper 108 to the first position.

Alternatively, in the defrost mode, the control module 102 can monitor a core temperature of the heat exchanger core 66 using at least one temperature sensor installed within the heat exchanger core 66. If the core temperature reaches a desired preset temperature (for example, 12° C.), the control module 102 can switch back to the normal mode.

In some examples, the temperature sensor installed within the heat exchanger core 66 can be used by the control module 102 to trigger the defrost mode, instead of, or in addition to, the temperature sensor measuring the temperature of the outside air. In these examples, the control module 102 can switch from the normal mode to the defrost mode if the core temperature approaches the freezing mark.

In other examples, the control module 102 can be programmed to switch from the normal mode to the defrost mode periodically. In these examples, the control module 102 can monitor air temperature, either continuously or periodically, and in the event that cold outside air is detected, the control module 102 can operate between the normal and defrost modes for preset intervals (for example, 30 minutes in normal mode, followed by 6 minutes in defrost mode, and so on). In the event of extremely cold weather (for example, if the air temperature is below −20° C.), duration of the normal interval can be decreased, and/or duration of the defrost interval can be increased (for example, 20 minutes in normal mode, followed by 10 minutes in defrost mode, and so on).

While the above description provides examples of one or more processes or apparatuses, it will be appreciated that other processes or apparatuses may be within the scope of the accompanying claims.

We claim:

1. An apparatus for heating, ventilation and/or air conditioning of an interior space of a structure, the apparatus comprising:
 a housing comprising an exhaust air inlet, an exhaust air outlet, an outside air inlet, and a supply air outlet;
 a heat exchanger core arranged in the housing and comprising a first side and a second side segregated from the first side;
 an exhaust air chamber arranged between the exhaust air inlet and the first side of the heat exchanger core;
 an outside air chamber arranged between the outside air inlet and the second side of the heat exchanger core;
 a heating/cooling device in fluid connection with the second side of the heat exchanger core;
 a supply air chamber arranged between the heating/cooling device and the supply air outlet;
 a recirculation port arranged between the supply air chamber and the outside air chamber; and
 a damper mechanism that is a single device that facilitates an approximately simultaneous opening of the recirculation port and closing of the outside air inlet, and vice versa, the damper mechanism comprising a damper adapted to move between a first position in which the damper blocks the recirculation port and a second position in which the damper blocks the outside air inlet and the recirculation port is unblocked,
 wherein, during operation in a defrost mode when the damper is in the second position, the exhaust air is guided to flow through the exhaust air inlet and the exhaust air chamber to the first side of the heat exchanger core, the outside air is blocked from flowing through the outside air inlet, and at least a portion of supply air is guided to flow from the supply air chamber through the recirculation port and the outside air chamber to the second side of the heat exchanger core, so as to defrost the heat exchanger core.

2. The apparatus of claim 1, wherein the supply air chamber is separated from the outside air chamber by a front panel, and the recirculation port is disposed in the front panel.

3. The apparatus of claim 2, wherein the damper is disposed in the outside air chamber.

4. The apparatus of claim 3, wherein the damper pivots between the first and second positions.

5. The apparatus of claim 4, wherein the damper mechanism further comprises a motor and a control arm, and the damper is coupled to the motor by the control arm, the motor and the control arm being adapted to move the damper between the first and second positions.

6. The apparatus of claim 5, wherein the damper is biased to the second position.

7. The apparatus of claim 1, wherein one of the exhaust air outlet and the exhaust air inlet is arranged on a side of the housing.

8. The apparatus of claim 7, wherein the one of the exhaust air outlet and the exhaust air inlet is disposed laterally adjacent to the heat exchanger core.

9. An apparatus, comprising:
 a heat exchanger core having a first side and a second side segregated from the first side;
 an exhaust air inlet in fluid connection with the first side of the heat exchanger core, and adapted to guide exhaust air to the first side of the heat exchanger core;

an exhaust air outlet in fluid connection with the first side of the heat exchanger core, and adapted to guide the exhaust air from the first side of the heat exchanger core to be expelled outside of an interior space;

an outside air inlet in fluid connection with the second side of the heat exchanger core, and adapted to guide outside air through an outside air chamber to the second side of the heat exchanger core, so as to exchange heat between the exhaust air flowing through the first side of the heat exchanger core and the outside air;

a heating/cooling device in fluid connection with the second side of the heat exchanger core, and adapted to condition the outside air to form supply air, and guide the supply air to a supply air chamber;

a supply air outlet in fluid connection with the supply air chamber, and adapted to guide the supply air from the supply air chamber to be delivered to the interior space;

a recirculation port arranged between the supply air chamber and the outside air chamber; and a damper disposed within the outside air chamber and adapted to pivot between a first position in which the damper blocks the recirculation port and the outside air inlet is unblocked, and a second position in which the damper blocks the outside air inlet and the recirculation port is unblocked, wherein, during operation in a defrost mode when the damper is in the second position, the exhaust air flows to the first side of the heat exchanger core, the outside air is blocked from flowing to the second side of the heat exchanger core, and at least a portion of the supply air is guided to flow from the supply air chamber through the recirculation port and the outside air chamber to the second side of the heat exchanger core, so as to defrost the heat exchanger core.

10. The apparatus of claim 9, wherein the supply air chamber is separated from the outside air chamber by a front panel, and the recirculation port is disposed in the front panel.

11. The apparatus of claim 9, wherein the damper is biased to the second position.

12. An apparatus, comprising:
a heat exchanger core having a first side and a second side segregated from the first side;

an exhaust air chamber for guiding exhaust air to the first side of the heat exchanger core;

an outside air chamber for guiding outside air from an outside air inlet to the second side of the heat exchanger core;

a heating/cooling device configured to condition the outside air to form supply air;

a supply air chamber for guiding the supply air from the heating/cooling device to be delivered to an interior space;

a recirculation port arranged between the outside air chamber and the supply air chamber; and a damper mechanism that is a single device that facilitates an approximately simultaneous opening of the recirculation port and closing of the outside air inlet, and vice versa, the damper mechanism comprising a damper that is movable between a first position in which the outside air inlet is open and the recirculation port is closed, and a second position in which the outside air inlet is closed and the recirculation port is open, wherein, during operation in a normal mode, the damper is in the first position, the exhaust air flows to the first side of the heat exchanger core, and the outside air flows to the second side of the heat exchanger core, and wherein, during operation in a defrost mode, the damper is in the second position, the exhaust air flows to the first side of the heat exchanger core, the outside air is blocked from flowing to the second side of the heat exchanger core, and at least a portion of the supply air is guided to flow from the supply air chamber through the recirculation port and the outside air chamber to the second side of the heat exchanger core, so as to defrost the heat exchanger core.

13. The apparatus of claim 12, wherein the supply air chamber is separated from the outside air chamber by a front panel, and the recirculation port is disposed in the front panel.

14. The apparatus of claim 12, wherein the damper is biased to the second position.

* * * * *